United States Patent [19]

Sando et al.

[11] Patent Number: 4,507,539

[45] Date of Patent: Mar. 26, 1985

[54] METHOD FOR CONTINUOUS TREATMENT OF A CLOTH WITH THE USE OF LOW-TEMPERATURE PLASMA AND AN APPARATUS THEREFOR

[75] Inventors: Yoshikazu Sando, Wakayama; Tokuju Goto, Nara; Itsuo Tanaka, Osaka; Hiroshi Ishidoshiro; Matsuo Minakata, both of Wakayama, all of Japan

[73] Assignee: Sando Iron Works Co., Ltd., Wakagama, Japan

[21] Appl. No.: 453,944

[22] Filed: Dec. 28, 1982

[30] Foreign Application Priority Data

Jan. 6, 1982 [JP]  Japan ................................ 57-814
Jan. 6, 1982 [JP]  Japan ................................ 57-815

[51] Int. Cl.³ .......................... B23K 9/00; B05D 3/06; D06C 1/00
[52] U.S. Cl. .................. 219/121 PY; 219/121 PG; 219/121 P; 264/22; 34/23; 68/5 E; 8/444; 8/149.2
[58] Field of Search ...... 219/121 P, 121 PY, 121 PD, 219/121 PE, 121 PF, 121 PG; 204/192 E, 164; 156/643, 345, 646; 264/22, 25; 8/444, DIG. 12, 149.1, 149.2; 68/5 D, 5 E; 34/23, 16

[56] References Cited

U.S. PATENT DOCUMENTS

| | | | |
|---|---|---|---|
| 3,651,671 | 3/1972 | Sando et al. | 68/5 E |
| 3,898,821 | 8/1975 | Kutz | 68/5 E |
| 3,907,607 | 9/1975 | Chu et al. | 156/646 |
| 4,151,034 | 4/1979 | Yamamoto et al. | 219/121 PG |
| 4,351,857 | 9/1982 | Ward et al. | 8/DIG. 12 |
| 4,411,075 | 10/1983 | Blaudszun | 68/5 E |

FOREIGN PATENT DOCUMENTS 2422500  2/1975  Fed. Rep. of Germany .......... 8/444

*Primary Examiner*—M. H. Paschall
*Attorney, Agent, or Firm*—Toren, McGeady and Stanger

[57] ABSTRACT

A method for the continuous treatment of a cloth using a low-temperature plasma, wherein a cloth is dried by heating the cloth in a reduced pressure chamber, and the cloth is then transported through a low-temperature plasma atmosphere in a low-temperature plasma treating chamber without exposing the cloth to the atmosphere under ordinary pressure. An apparatus for carrying out the process is also disclosed. The cloth can further be subjected to the low-temperature plasma polymerization treatment in another reduced pressure chamber.

4 Claims, 2 Drawing Figures

METHOD FOR CONTINUOUS TREATMENT OF A CLOTH WITH THE USE OF LOW-TEMPERATURE PLASMA AND AN APPARATUS THEREFOR

BACKGROUND OF THE INVENTION

The present invention relates to a method for continuous treatment of a cloth with the use of low-temperature plasma and an apparatus therefor. The cloth comprises woven, knitted and non-woven ones, and the treatment comprises pretreatment and finishing, particularly resin finishing.

In subjecting a cloth to pretreatment such as desizing and scouring industrially, large quantities of treating agent, water resource and energy must be consumed. For instance, in scouring a cloth, the cloth is treated with an alkaline solution containing such agent as caustic soda or soda ash and a scouring agent by boiling or by steaming for solubilizing water repellent foreign matters contained in the cloth, then the cloth is repeatedly washed with water for removing solubilized foreign matters and the agents adhering to the cloth, and the cloth is finally dried.

In finishing treatment of a cloth such as water repellent finish, antistatic finish and soil release finish, the cloth is treated with a finishing agent dissolved or dispersed in water, also consuming large quantities of treating agent, water and energy.

Under such circumstances, it has recently been proposed to subject a cloth to a low-temperature plasma treatment for desizing and scouring, and further to finishing such as resin finish by low-temperature plasma graft polymerization. As for the reforming of a cloth by graft polymerization with the use of low-temperature plasma treatment, for instance, it is described in Acta Polymeria, 32 (1981), p.203 that acrylic acid monomer is polymerized with the use of plasma on the surface of polyester fibers, and in Textile Research Journal, May 1972, p.307 that a fluorine compound is polymerized to wool by means of plasma.

However, in low-temperature plasma treatment of a cloth, it is necessary to remove volatile matters contained in the cloth as far as possible just before the cloth is supplied in a low-temperature plasma treating chamber. The reason is that, if a cloth containing volatile matters is supplied in a low-temperature plasma atmosphere in the treating chamber, the vacuum degree of the treating chamber is lowered owing to the volatilization of the volatile matters to hinder the formation of low-temperature plasma and to cause side reactions from the reason that the volatile matters themselves act as low-temperature plasma. Further, since the life of activated surface of the cloth due to the treatment with low-temperature plasma is very short, the polymerization treatment thereof with polymerizable monomer must be done immediately after the low-temperature plasma treatment.

SUMMARY OF THE INVENTION

The object of the present invention is to offer a method and an apparatus for treating a cloth with the use of low-temperature plasma.

The outline of the present invention is to divide a low-temperature plasma reactor of a cloth into three chambers, a first reduced pressure chamber, a low-temperature plasma treating chamber and a second reduced pressure chamber in succession, volatile matters contained in the cloth are removed by volatilization in the first reduced pressure chamber, and the low-temperature plasma treatment is done in the low-temperature plasma treating chamber without exposing the cloth to an atmosphere under the ordinary pressure. In case when graft polymerization is done, the said treatment is done in the second reduced pressure chamber immediately after the low-temperature plasma treatment is done.

DETAILED DESCRIPTION OF THE PREFERRED EMBODIMENTS

The preferred embodiments of the present invention will be described in detail in the following with reference to the examples of the present inventive apparatus shown in the attached drawings.

EXAMPLE 1

Figure 1:
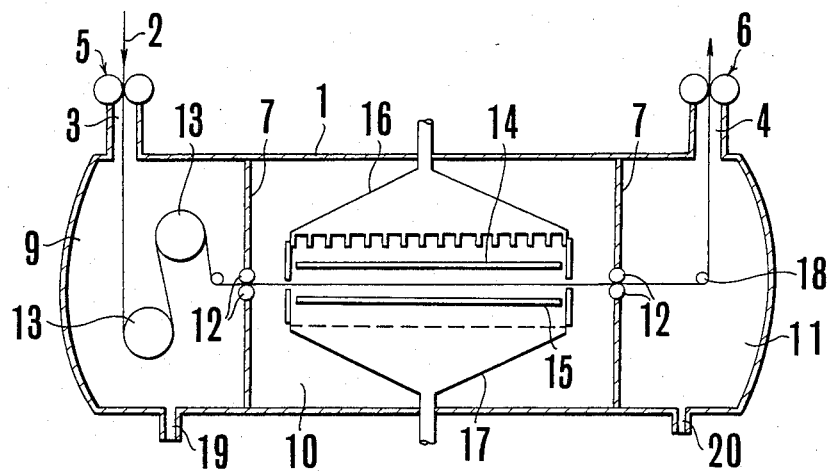
FIG. 1 is an example of the present inventive apparatus for carrying out the continuous treatment of a cloth with the use of low-temperature plasma.

An example of the present inventive apparatus for carrying out the continuous treatment of a cloth with the use of low-temperature plasma is as shown in FIG. 1.

In FIG. 1, 1 is a reactor for carrying out the continuous treatment of a cloth with the use of low-temperature plasma. The low-temperature plasma treating reactor 1 is provided with an inlet 3 and an outlet 4 for taking in and out of a cloth to be treated, 2, continuously through the reactor 1. The inlet 3 and the outlet 4 are provided respectively with seal mechanisms 5 and 6 which can pass a cloth continuously through the reactor 1 by maintaining the interior of the reactor to reduced pressure with a vacuum degree of 0.1 to 10 Torr or desirably 0.5 to 2 Torr. The seal mechanisms for the use of 5 and 6 have been developed by the present inventors. The interior of the reactor 1 is divided with partition walls 7 into three sections, a first reduced pressure chamber 9, a low-temperature plasma treating chamber 10 and a second reduced pressure chamber 11, in succession along the transporting direction of the cloth 2. The partition walls 7 are provided respectively with a seal roll 12 which can pass the cloth 2 by preventing the permeability of a gas between adjacent chambers. Lip seals may be applied instead of seal rolls.

In the first reduced pressure chamber 9, contact drying means of a cloth comprising hot cylinder rolls 13 are provided. As the drying means of a cloth, a microwave heater drier and an infrared heater drier may also be applied. In the interior of the low-temperature plasma treating chamber 10, a low-temperature plasma treating means is provided. This low-temperature treating means comprises a pair of electrode plates 14 and 15 provided up and down by putting a cloth passage therebetween, for instance, one of the electrode plates, for instance, the electrode plate 14 being connected to a high frequency electric current oscillator (not shown in the figure), and the other electrode plate, for instance the electrode plate 15%, being earthed. The electrode plates 14 and 15 are made of metal wire gauge or porous metal plate for distributing gas uniformly all over the electrode plates to produce uniform low-temperature plasma from the total surface of the electrode plates and to float the gas activated by the high frequency electric wave nearly uniformly in the vicinity of the electrode plates. 16 is a gas nozzle for blowing a gas to the electrode plate 14 uniformly, and 17 is a gas duct provided at the opposite position of the gas nozzle 16 by putting the electrode plates 14 and 15 therebetween, and this gas duct 17 is connected to a vacuum pump (not shown in the figure). 18 is a cloth guide roll provided in the second reduced pressure chamber, and 19 and 20 are vacuum pipes provided respectively to the first and the second reduced pressure chambers 9 and 11.

The construction of the apparatus of this example is as above described. Now, its function will be described in the following.

A cloth to be treated 2 is arranged through the reactor 1 as shown in the figure. A vacuum pump (not shown in the figure) is operated firstly for evacuating the reactor through the vacuum pipes 19 and 20 and the gas duct 17 until the vacuum degree of the first and the second reduced pressure chambers 9 and 11 becomes from 10 to 100 Torr and the vacuum degree of the low-temperature plasma treating chamber 10 becomes not more than 0.5 Torr. When the vacuum degrees of the three chambers are controlled as above described, the drying means provided in the first reduced pressure chamber 9 is operated, and a gas is supplied from the gas nozzle 16 in the low-temperature plasma treating chamber 10 to control the vacuum degree of the chamber to 0.1 to 10 Torr, or desirably 0.5 to 2 Torr, while applying high frequency electric wave desirably with a frequency of 1 KHz to 300 KHz. The gas to be supplied is air, argon, helium, nitrogen, carbon dioxide, carbon monoxide and so on. The reason why the vacuum degree in the low-temperature plasma treating chamber is defined to 0.1 to 10 Torr is that the occurrence of low-temperature plasma becomes unstable when the vacuum degree is above 10 Torr, and on the other hand, when the vacuum degree is maintained to not more than 0.1 Torr, not only the maintenance and operation costs become high in the points of the capacity of the vacuum pump and the seal mechanism but also the concentration of the low-temperature plasma becomes too low, deteriorating the treating effect. When a gas is supplied from the gas nozzle 16 to the pair of electrodes 14 and 15 to which high frequency electric wave is applied, low-temperature plasma is produced, and the low-temperature plamsa treating chamber 10 becomes in an atmosphere of low-temperature plasma. In transporting the cloth 2 through the reactor 1, the cloth is dried frstly in the first reduced pressure chamber 9, to remove volatile matters, the thus treated cloth is then treated with low-temperature plasma in the low-temperature plasma treating chamber 10, and the cloth is taken out of the reactor 1 by passing through the second reduced pressure chamber 11.

As above described in detail, the apparatus in this example comprises providing a pair of reduced pressure chambers immediately before and behind a low-temperature plasma treating chamber capable of transporting a cloth to be treated therethrough, and providing a heating means in the former reduced pressure chamber for removing volatile matters contained in the cloth to be introduced in the low-temperature plasma treating chamber. The cloth entering in the low-temperature plasma treating chamber has been freed from the volatile matters contained therein in the first reduced pressure chamber just before the cloth is supplied in the low-temperature plasma treating chamber, and therefore, the low-temperature plasma atmosphere in the low-temperature plasma treating chamber can be maintained satisfactorily and the low-temperature plasma treatment can be done excellently with no hindrance due to the evolution of volatile matters. The two reduced pressure chambers provided before and behind the low-temperature plasma treating chamber serve to maintain the vacuum degree of the low-temperature plasma treating chamber for increasing the efficiency of the low-temperature plasma treatment.

EXAMPLE 2

Figure 2:
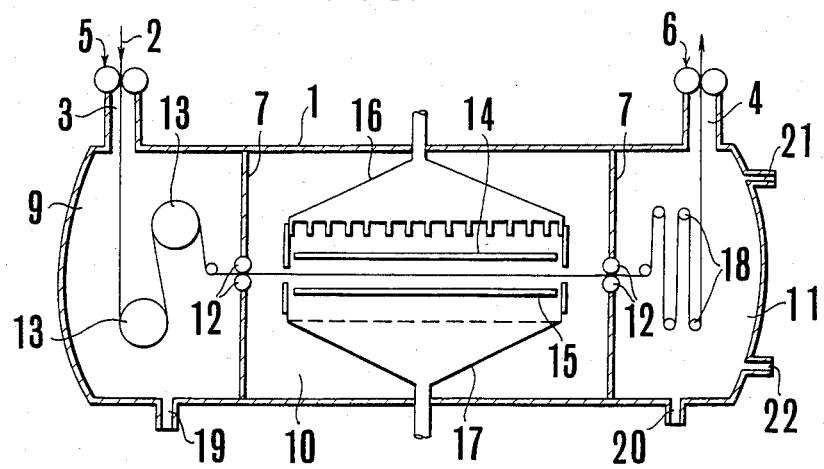
FIG. 2 is a modification thereof for the purpose of carrying out resin finishing by graft polymerization.

FIG. 2 is to show a modification of the present inventive apparatus in Example 1 shown in FIG. 1. This exampl is particularly suitable for the purpose of carrying out resin finishing by graft polymerizaio due to the effect of low-temperature plasma.

In FIG. 2, what is different from FIG. 1 is that a gas supply pipe 21 and a gas exhaust pipe 22 are provided in the second reduced pressure chamber 11 for passing a monomer gas for graft polymerization thrugh the chamber.

In operating the apparatus, the first reduced pressure chamber 9 and the low-temperature plasma treating chamber 10 are arranged similarly a in Example 1, and further, in the second reduced pressure chamber 11, a polymerizable monomer gas is supplied from the gas suply pipe 21. The kind of monomer gas and its vacuum degree ae controlled according to the object. The gases desirably applied ae such monomers as of acrylic acid, acrylic acid ester and methacrylic acid ester. When air is remained in the second reduced pressure chamber 1, air acts as a polymerization inhibitor in some instances. Therefore, it is desirable to replace ar in this chamber previously with a monomer by using the gas supply pipe 21 and the gas exhaust pipe 22. The exhausted monomer may be reused by remoing impurities therefrom. Then, a cloth to be treated 2 is trasported through the reactor 1. The cloth is dried to remove vlatile matters contained in the cot in the first reduced pressure chamber 9, the surface of the cloh is activated due to the effect of low-temperature plasma in low-temperature plasma treating chamber 10, and the low-temperature plasma graft polymerization of the cloth is completed in the second reduced pressure chamber 11. A cloth activated with low-temperature plasma in the low-temperature plasma treating chamber 10 is transported immediately to the second reduced pressure chamber 11 with no contact with the air under the ordinary pressure and treated with polymerizable monomer gas in this chamber, so that the reforming of a cloth due to the effect of plasma polymerization can be done quite effectively and eminently.

What we claim:

1. A method for continuous treatment of a cloth with the use of low-temperature plasma, comprising drying a cloth to be treated by heating the cloth in a reduced pressure chamber at a pressure between 10 to 100 Torr, and directly transporting the cloth without exposing the cloth to atmospheric pressure through a low-temperature plasma atmosphere in a low-temperature plasma treating chamber at a pressure between 0.1 to 10 Torr and an electric frequency of 1 KHz to 300 MHz.

2. A method for continuous treatment to a cloth with the use of low-temperature plasma according to claim 1, in which the cloth transported through the low-temperature plasma treating chamber is further treated with a polymerizable monomer gas in another reduced pressure chamber for low-temperature plasma polymerization treatment of the cloth.

3. An apparatus for the continuous treatment of cloth with the use of low-temperature plasma, comprising a low-temperature plasma treating reactor divided into three chambers, the first chamber being capable of heating the cloth therein at a reduced pressure between 10 to 100 Torr and in sequence, a low-temperature plasma treating chamber and thereafter a second reduced pressure chamber capable of subjecting the cloth therein to a pressure between 10 to 100 Torr, each of the three chambers being arranged so that the cloth in passing from one chamber to the next, is not exposed to atmospheric pressure.

4. An apparatus for continuous treatment of a cloth with the use of low-temperature plasma according to claim 3, which further comprises a gas supply pipe and a gas exhaust pipe provided in the second reduced pressure chamber for passing a polymerizable monomer through the chamber.

* * * * *